(12) United States Patent
Best et al.

(10) Patent No.: US 9,353,972 B2
(45) Date of Patent: May 31, 2016

(54) SOLAR COLLECTION SYSTEM AND METHOD

(71) Applicants: R. Curtis Best, Galivants Ferry, SC (US); Lawrence J. Mudd, Galivants Ferry, SC (US); William E. Hucks, Loris, SC (US); James H. Pinner, Jr., Bonneau, SC (US)

(72) Inventors: R. Curtis Best, Galivants Ferry, SC (US); Lawrence J. Mudd, Galivants Ferry, SC (US); William E. Hucks, Loris, SC (US); James H. Pinner, Jr., Bonneau, SC (US)

(*) Notice: Subject to any disclaimer, the term of this patent is extended or adjusted under 35 U.S.C. 154(b) by 0 days.

(21) Appl. No.: 14/500,186

(22) Filed: Sep. 29, 2014

(65) Prior Publication Data

US 2016/0091223 A1    Mar. 31, 2016

(51) Int. Cl.
*F24J 2/00* (2014.01)
*F24J 2/38* (2014.01)
*F24J 2/24* (2006.01)
*F24J 2/34* (2006.01)

(52) U.S. Cl.
CPC .... *F24J 2/38* (2013.01); *F24J 2/24* (2013.01); *F24J 2/345* (2013.01)

(58) Field of Classification Search
CPC .................. F24J 2/24; F24J 2/345; F24J 2/38
USPC .......................... 126/634, 641, 714, 573, 587
See application file for complete search history.

(56) References Cited

U.S. PATENT DOCUMENTS

| 4,401,103 | A | 8/1983 | Thompson |
|---|---|---|---|
| 4,676,227 | A * | 6/1987 | Walters .................... F24J 2/247 126/651 |
| 6,630,622 | B2 | 10/2003 | Konold |
| 7,055,519 | B2 | 6/2006 | Litwin |
| 7,296,410 | B2 | 11/2007 | Litwin |
| 8,686,279 | B2 | 4/2014 | Almogy et al. |
| 2005/0133082 | A1 | 6/2005 | Konold et al. |
| 2008/0078435 | A1 | 4/2008 | Johnson |
| 2008/0314438 | A1 | 12/2008 | Tran et al. |
| 2009/0205637 | A1 | 8/2009 | Moore et al. |
| 2009/0293940 | A1 | 12/2009 | Sharpe |
| 2011/0061719 | A1* | 3/2011 | Tsadka ...................... F24J 2/12 136/246 |
| 2012/0067338 | A1* | 3/2012 | Funcheon ............ B01D 1/0035 126/602 |

* cited by examiner

*Primary Examiner* — Kenneth Rinehart
*Assistant Examiner* — Gajanan M Prabhu
(74) *Attorney, Agent, or Firm* — P. Jeff Martin; The Law Firm of P. Jeffrey Martin, LLC

(57) ABSTRACT

An apparatus, system, and method of collecting solar energy having a variable position for optimizing sunlight collection and for use in a heating and/or cooling system. The system includes a solar collector apparatus, a collector support frame assembly, a sun position tracking apparatus, a fluid transfer pump, a fluid storage tank, an insulated pipe for connecting the fluid pump to the storage tank and the solar collector, a differential temperature controller, and a safety override relay controller.

8 Claims, 12 Drawing Sheets

SOLAR COLLECTION SYSTEM AND METHOD

FIELD OF THE INVENTION

This invention relates to harnessing and utilizing solar energy, and more particularly, to an apparatus, system, and method of collecting solar energy having a variable position for optimizing sunlight collection and having usage in multiple heating and/or cooling system.

BACKGROUND OF THE INVENTION

Solar collecting devices are well known in the art. A multitude of different devices and configurations of devices have been attempted to improve the collection and conversion of sunlight and to use the converted energy for a variety of applications. In particular, these types of devices and systems have been used to provide supplemental energy for commercial and residential structures, and in particular for heating hot water supplies including water heaters, hot-tubs, pools, and other similar units.

There are several concerns in utilizing such devices and systems. The concerns include but are not limited to the fixed orientation of the solar collecting apparatus that limits optimized sun collection to a small portion of daylight hours. Moreover, the necessary use of glycol or other antifreeze fluids and/or systems to prevent freezing and/or rupturing of the system tubing is a concern.

Accordingly, there is an unresolved need to provide an apparatus and/or system for optimizing sunlight collection, and in providing an apparatus that may be oriented to optimize collection across a greater portion of daylight hours, as well as an apparatus and/or system that avoids using glycol or other antifreeze fluids to prevent freezing.

A search of the prior art did not disclose any patents that read directly on the claims of the instant invention; however, the following references were considered related:

U.S. Pat. No. 6,630,622 B2, issued in the name of Konold;
U.S. Pat. No. 7,055,519 B2, issued in the name of Litwin;
U.S. Pat. No. 7,296,410 B2, issued in the name of Litwin;
U.S. Patent Application no. 2008/0314438 A1, published in the name of Tran et al.;
U.S. Patent Application no. 2005/0133082 A1, published in the name of Konold et al.;
U.S. Patent Application no. 2008/0078435 A1, published in the name of Johnson;
U.S. Patent Application no. 2009/0205637 A1, published in the name of Moore et al.;
U.S. Pat. No. 4,401,103, issued in the name of Thompson;
U.S. Patent Application no. 2009/0293940 A1, published in the name of Sharpe;
U.S. Pat. No. 8,686,279 B2, issued in the name of Almogy et al.; and
U.S. Patent Application no. 2011/0061719 A1, published in the name of Tsadka et al.

SUMMARY OF THE INVENTION

Example embodiments provide a solar collection system. The solar collection system comprises a solar collector apparatus; a collector support frame assembly; a sun position tracking apparatus and storage tank to solar collector apparatus; a fluid transfer pump; a fluid storage tank; an insulated pipe for connecting a transfer pump to a storage tank; a differential temperature controller; photovoltaic battery back-up regulated power supply; and a safety override relay controller. The solar collector apparatus comprises a Photovoltaic and providing the battery back-up regulated power supply; a glaze; a differential controller probe and safety override controller probe; a radiant-to-heat energy converter absorber having concentric tri-layered tubing; a mounting backboard; insulating layers; a bottom panel; an outer mold having a plurality of spacers disposed between outer circle of the concentric tri-layered tubing, the mounting backboard, the insulating layers, and the bottom panel to control heat loss via conduction, convection, and/or radiation. The sun position tracking apparatus comprises a sensor module; a dual axis controller module for automatically adjusting the solar collector apparatus bi-directionally in as the azimuth of the sun changes throughout the day and seasons; and an auxiliary/support safety override controller probe.

DESCRIPTION OF THE EMBODIMENT(S)

Figure 1:
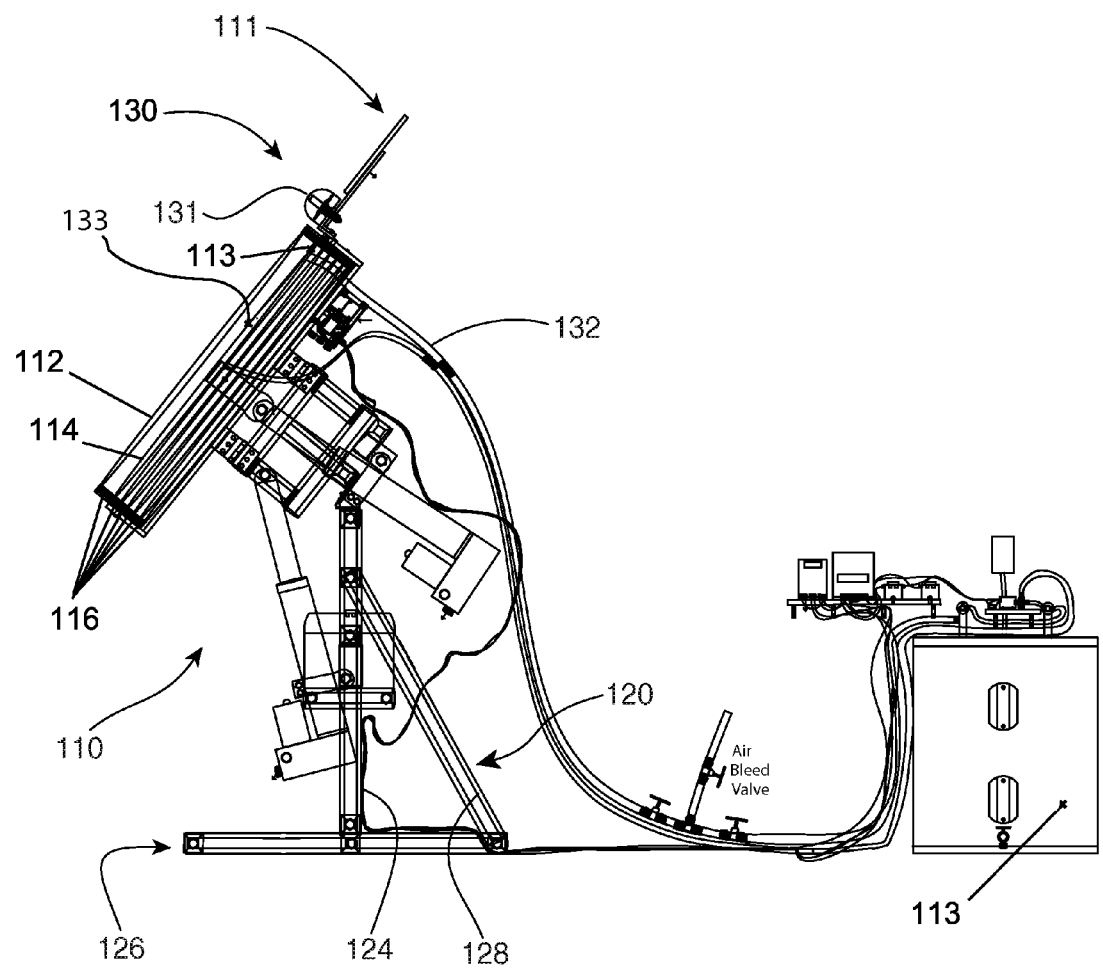
FIG. 1 illustrates a solar collecting system.

It will be readily understood that the components of the present invention, as generally described and illustrated in the figures herein, may be arranged and designed in a wide variety of different configurations.

Thus, the following detailed description of the embodiments as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

As generally depicted in the figures, a solar collection system 100 is represented. The system 100 comprises a solar collector apparatus 110, a collector support frame assembly 120 supporting the solar collector apparatus 110. The system 100 may also include a sun position tracking apparatus 130, and in at least one embodiment is envisioned as coupled with the solar collector apparatus 110 and support frame assembly 120. The system 100 may also include a fluid transfer pump 140, a fluid storage tank 150, and an insulated pipe 160 that couples the pump 140 and tank 150 to the solar collector apparatus 110. The system 100 may also include a differential temperature controller 170 operatively coupled with the solar collector apparatus 110 and the storage tank 150, and the fluid transfer pump 140. The system 100 may also include a safety-override relay controller 180 operatively coupled with the sun position tracking apparatus 130, and the sensor module 131 (all described in further detail below). The system 100, and the apparatuses comprising the system 100, operates without the necessity or optional use of glycol or other similarly utilized anti-freezing fluids, as the system 100 (and components) as arranged and describe function without such anti-freezing concerns. Moreover, the system 100, and the apparatuses comprising the system 100, may be selectively coated with material for retaining the energy absorbed by system and apparatuses and minimizing heat-loss once the system has been heated by the absorbed energy. Envisioned is the utilization of carbon black, although other materials (such as black copper, black chrome, or the like), may be used.

Figure 2:
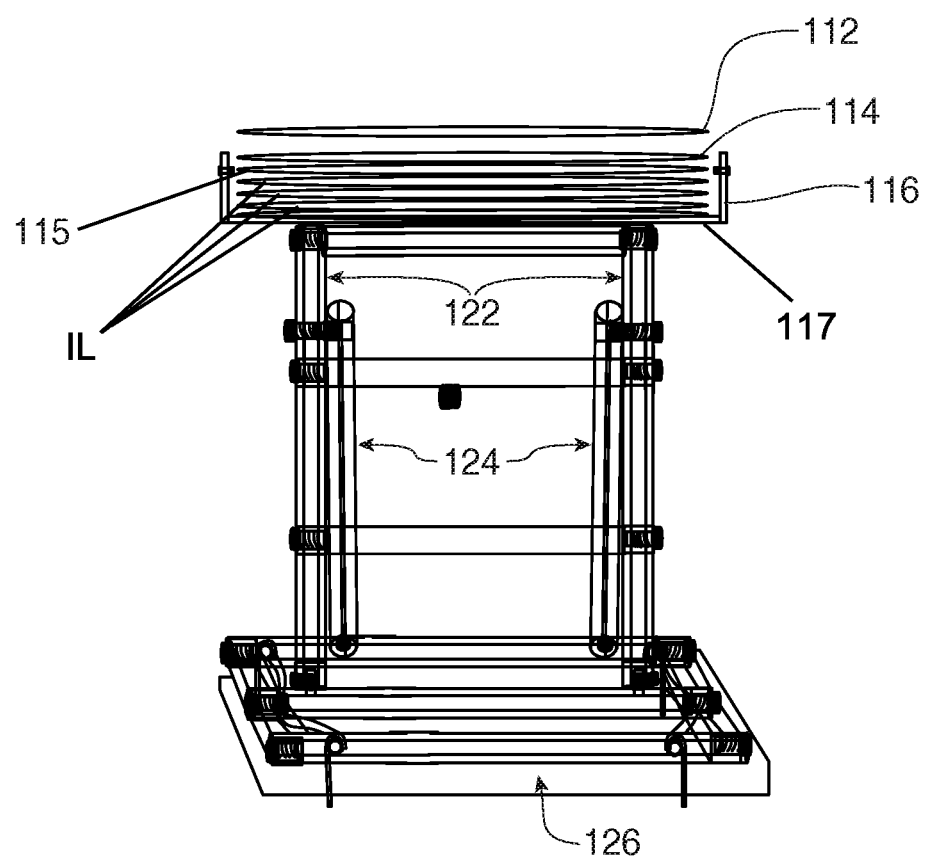
FIG. 2 is a front vertical rotated view of the solar collecting apparatus comprising part of the system of FIG. 1, according to example embodiments.
Figure 3:
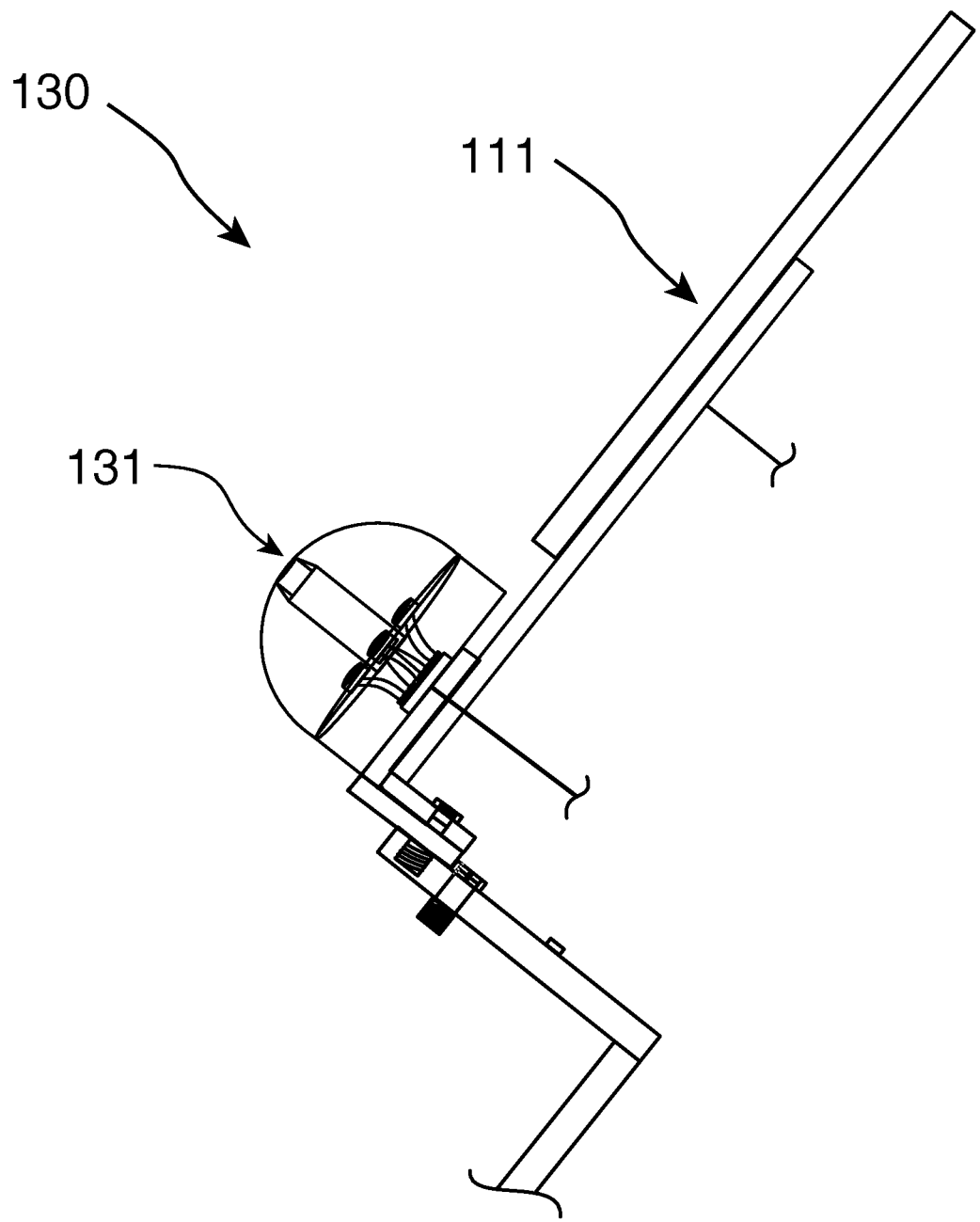
FIG. 3 illustrates a sensor module of the sun position tracking apparatus.
Figure 4:
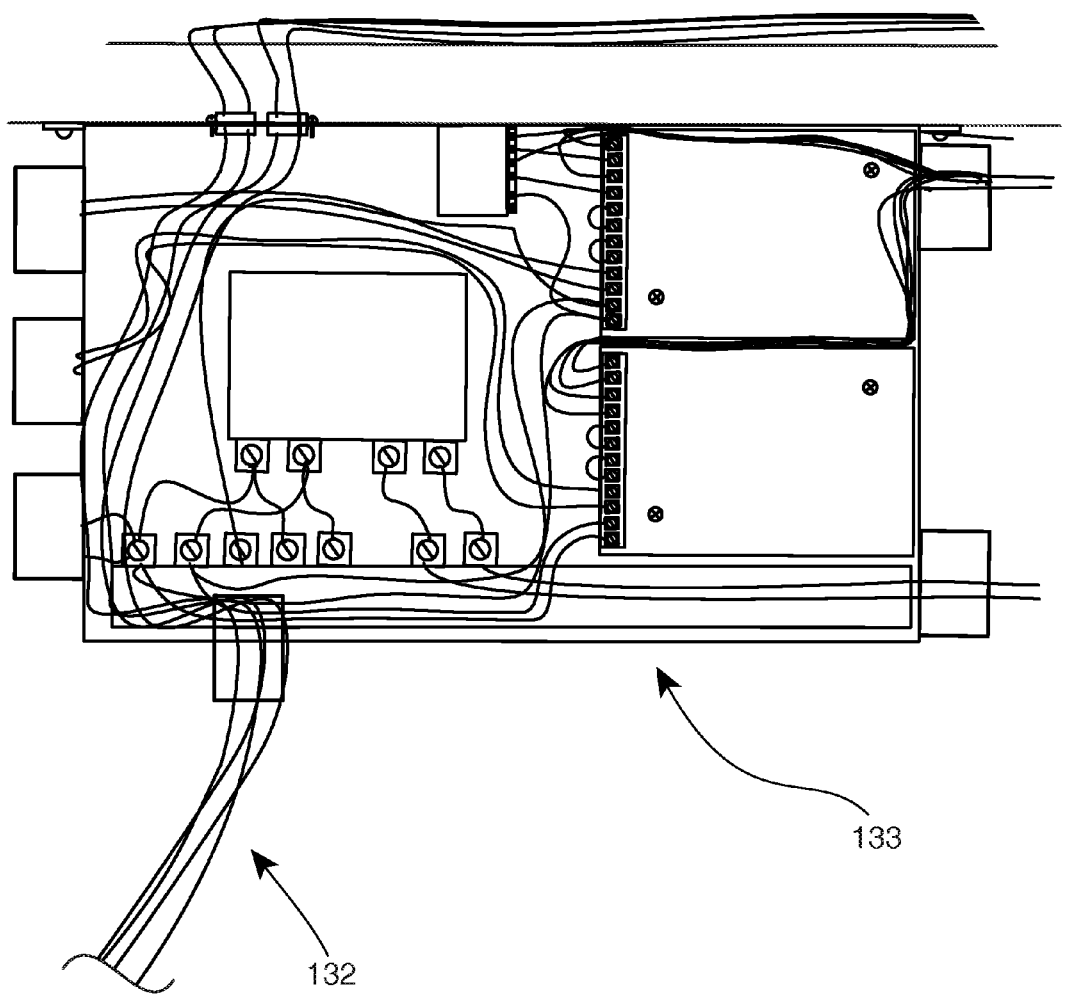
FIG. 4 illustrates a dual axis controller module.
Figure 5:
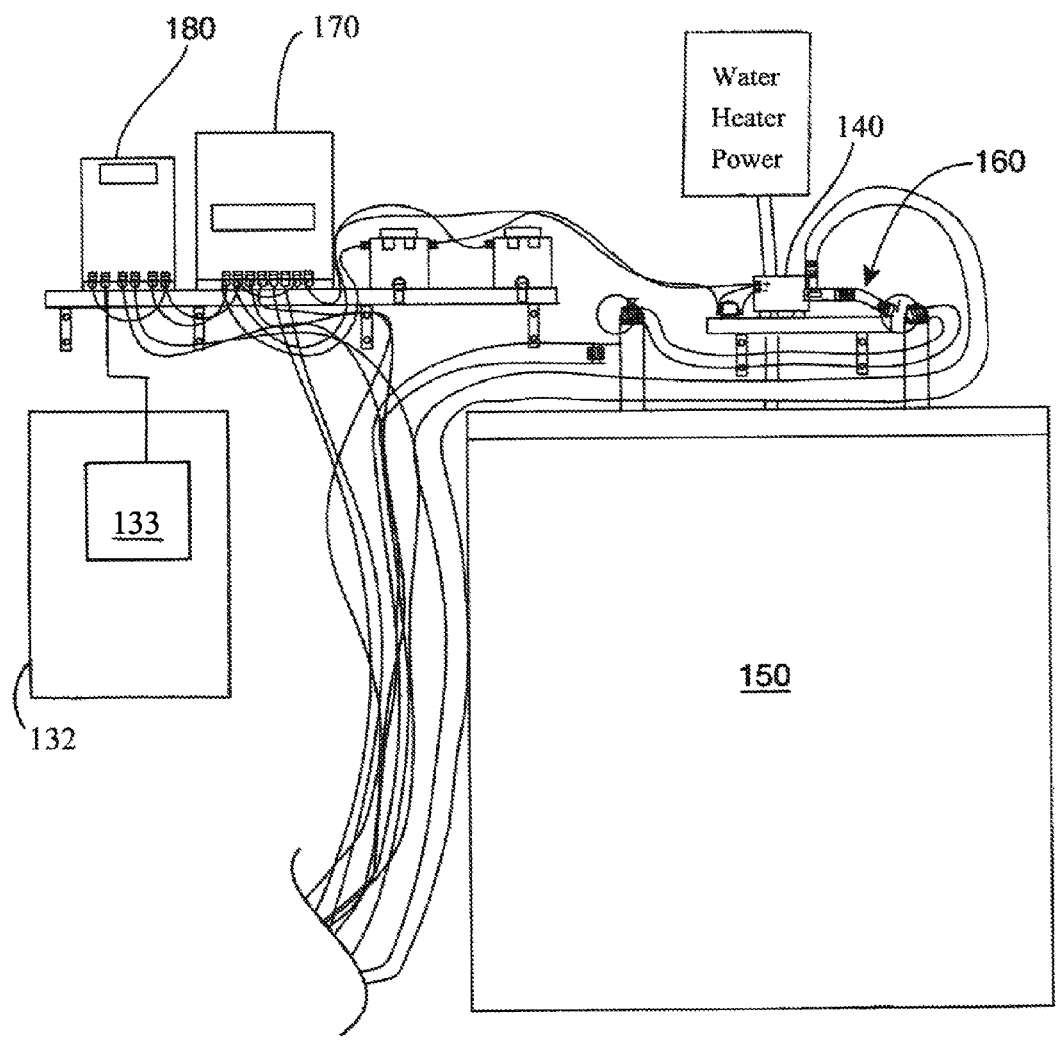
FIG. 5 illustrates a differential temperature controller operatively coupled to a pump and safety override relay controller operatively coupled to a sensor module.

The solar collector apparatus 110 may comprise a variety of components and materials. In one embodiment, the solar collector apparatus 110 comprises a photovoltaic panel 111 (for the battery back-up regulated power supply) and a glaze 112 mounted on to the solar collector apparatus 110, mounted to the support frame assembly 120. The solar collector apparatus 110 may include additional components, including a differential controller probe 113, a radiant-to-heat energy converter absorber 114, and a mounting backboard 115, each component arranged subjacent to the glaze 112. An outer molding having plurality of spacers 116 may be interposed within the radiant-to-heat energy converter absorber 114 (as explained in greater detail below). A bottom panel 117 may be arranged subjacent to the mounting backboard 115. A plurality of insulating layers IL may be disposed between the radiant-to-heat energy converter absorber 114 and the bottom panel 117, as illustrated in FIG. 2.

The photovoltaic panel 111 may include solar cells of photovoltaic material(s) used to convert sunlight into electrical current. A variety of photovoltaic material are used to achieve this energy conversion, materials well-known in the art, and are therefore contemplated for use as incorporated into the photovoltaic panel 111 recited above. It is envisioned that a separate layer of glass may be used and installed superjacent to the photovoltaic panel 111 to provide protection from the environment. The photovoltaic panel 111 may be arranged to set along an area comprising part of a perimeter of the glaze 112. As depicted in the figures, the photovoltaic panel 111 sets above the glaze 112 in a perimeter-margin immediately above the glaze 112.

The differential controller probe 113 may be at least one thermistor probe mounted on top of the concentric tri-layered tubing. The at least one thermistor probe measures and the differential controller compares the fluid temperature between the concentric tri-layered tubing and the bottom of the water heater. When the fluid temperature comparisons (the collector apparatus being the hotter) exceed a preset variance (usually 10 degrees Fahrenheit), the differential controller activates the transfer pump and moves the hotter fluid from the collector apparatus to the water heater tank until equilibrium is reached, in which the controller de-activates the pump.

The radiant-to-heat energy converter absorber 114 may comprise a variety of arrangements or configurations so long as it circulates heat transfer fluid (e.g., water and/or anti-freeze) to the storage tank 150. In one embodiment, it is envisioned that the radiant-to-heat energy converter absorber 114 comprises a single layer of concentric tri-layered tubing 114 mounted above the mounting backboard 115 and the back panel 117. In particular, it is envisioned that the radiant-to-heat energy converter absorber 114 comprises a single layer of concentric tri-layered tubing 114'. It is also envisioned that an outer mold having a plurality of spacers 116 interposed between the outer circle of the single layer of concentric tri-layered tubing 114', the mounting backboard, the insulating layers and the back panel to inhibit and control heat loss via conduction, convection, and radiation.

The collector support frame assembly 120 may comprise a variety of configurations and arrangements so long as the frame assembly 120 supports the solar collector apparatus 110 and the sun position tracking apparatus 130. As depicted, the frame assembly 120 is mounted with the back panel 117 of the solar collector apparatus 110, and may be achieved by the utilization of one or more mounting assembly 122. The mounting assembly 122 may be supported by one or more central arm(s) 124, which is/are upstanding from a base 126. One or more angled-arm(s) 128 may be used to provide additional support and stability to the central arm(s) 124.

The sun position tracking apparatus 130 automatically tracks the position of the sun to automatically adjust the solar collector apparatus 110 to achieve optimum sun-light absorption as the position of the sun changes during the course of the day and season(s). It is envisioned that the tracking apparatus 130 comprises a sensor module 131, a dual-axis controller module 132, a safety override relay controller probe 133, and a safety override controller 180. The sensor module 131 receives sunlight and based on the center intensity movement of the light, creates a center offset with the dual axis controller module 132 to generate an output that actuates the change in position of the solar collector apparatus 110. The controller module 132 controls a plurality of actuators 134 for controlling the horizontal and vertical movement of the solar collector apparatus 110 in response to the change in the sun's path as its azimuth changes. It is envisioned that the actuators may comprise electrical, hydraulic, pneumatic, or other similarly controlled device for controlling such movement(s). The safety override relay controller probe 133 may be mounted on the top surface of the concentric tri-layered tubing near the center of the collector. The controller probe 133 protects the tubing from over-heating by setting the safety override controller to default (preset maximum temperature setting), which actuates the safety override relay to disconnect the sensor module from the dual axis controller module. Through this series of actions, the apparatus 110 is returned to the east position away from the sun, where it remains until the over-heating problem is corrected and the controller is reset.

The differential temperature controller 170 may be incorporated into the system 100. The differential temperature controller 170 may be used to determine when to cycle heat or cold or collect heat or cold based on the temperature difference between the storage tank temperature and the collector temperature. The differential temperature controller 170 is operatively and electrically coupled with the transfer pump 140. If the programmed temperature threshold(s) is/are met, the differential temperature controller 170 electrically connects to the transfer pump 140 to actuate the appropriate fluid pumping action to cycle heat to the storage tank 150 and cold to the solar collector apparatus.

The safety override relay controller 180 may be incorporated into the system 100. The safety override relay controller 180 monitors the system temperature to detect input and/or output failures, and removes sensor module input to the dual axis controller module sending the solar collector apparatus back to an east position. Tracking may not be restored to the system until the failure is identified and corrected. Such safety monitoring is a redundant feature of a system and operates to prevent catastrophic failure(s) leading to extensive damage, injury, and/or death.

The devices and system 100 described above is envisioned as appropriate for incorporation with a variety of temperature controlling devices and systems. For example, it is envisioned that in one embodiment the system 100 may be incorporated to provide supplemental heating and cooling for a HVAC heating/cooling system for a commercial or residential structure. It is envisioned that the elements and components of the disclosed devices and system are replaceable by identical or similar components, whether for repair or maintenance.

Figure 6:
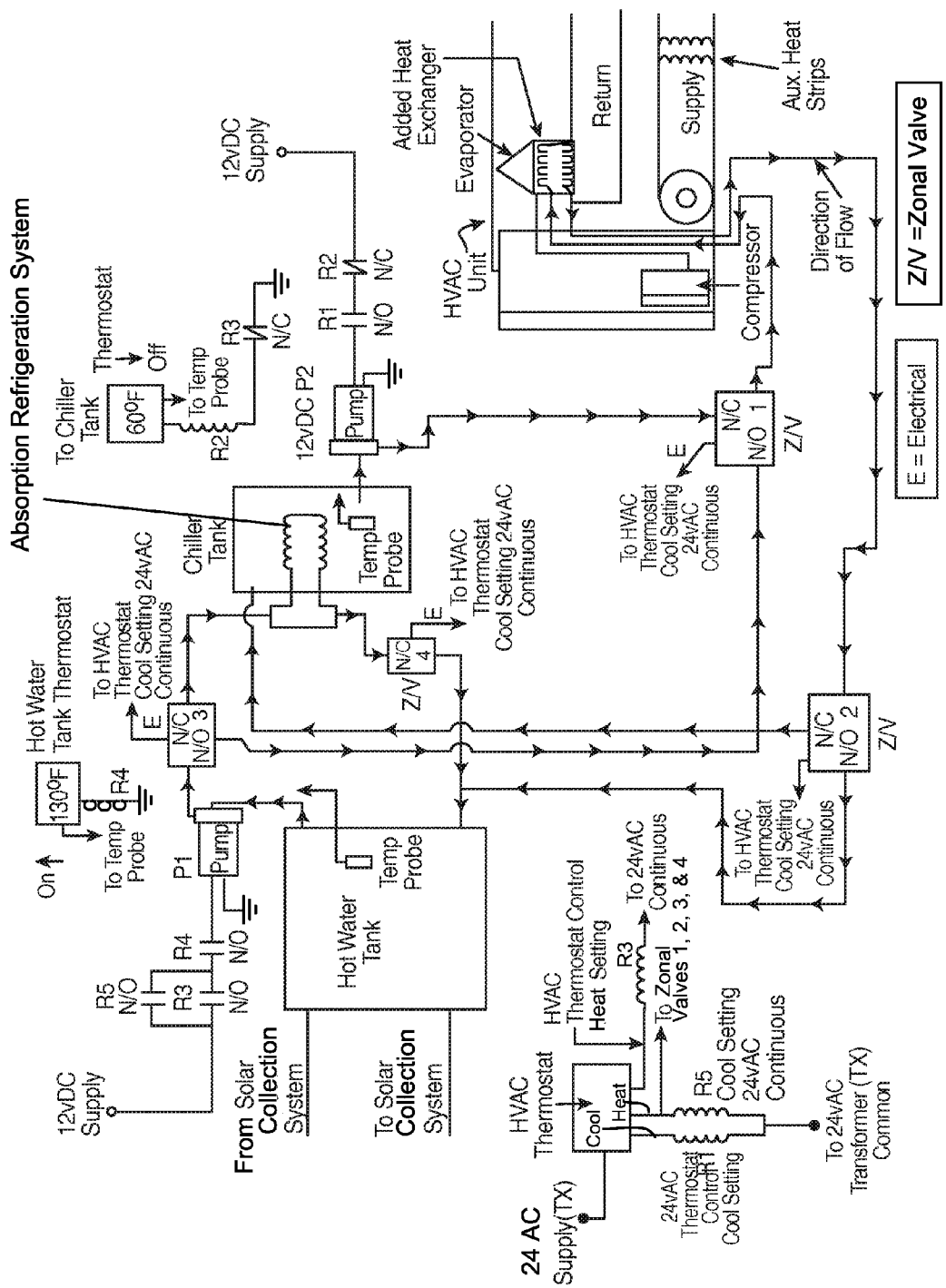
FIG. 6 is a schematic illustration of a solar collecting system incorporated with a heating ventilation air conditioning (HVAC) system.
Figure 7:
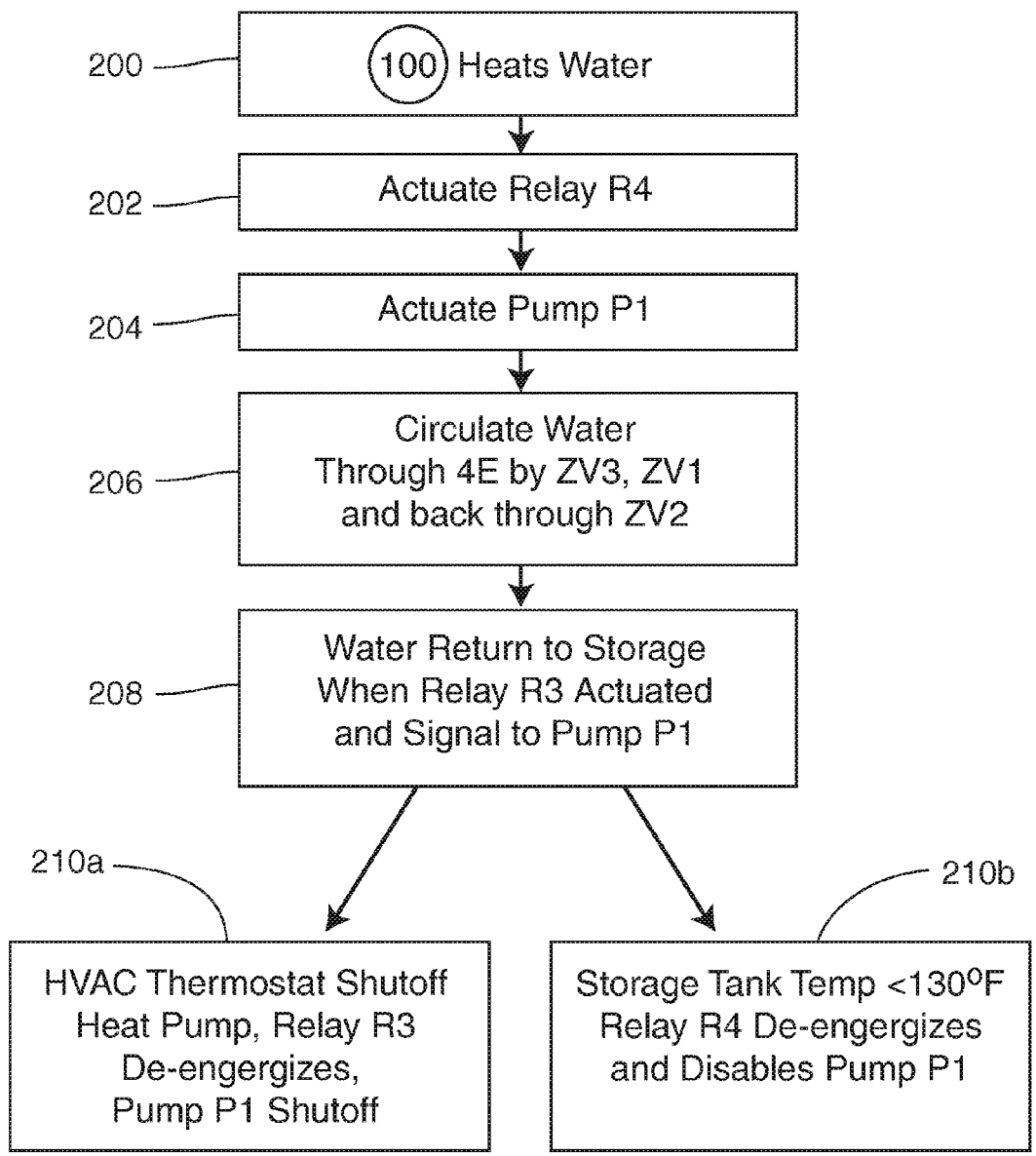
FIG. 7 is a schematic illustrating the steps of the solar collecting system operating in cooperation with an HVAC system set to the heat cycle.

As illustrated in FIGS. 6 and 7, a schematic diagram of the heating and/or cooling activity achieved by the combination of system 100 with a HVAC heating/cooling system, a method for providing supplemental heating and/or cooling is described. Where indicated, an N/O (normally open) port of each zonal valve means that fluid may pass through, and when voltage is applied at an E-connector, the N/O valve closes. Conversely, an N/C (normally closed) port of each zonal valve means that fluid may not pass through, and when voltage is applied at an E-connector, the valve opens.

Accordingly, step 200 has the system 100 heat the water stored in a hot water storage tank to at least 130 degrees Fahrenheit, a temperature threshold that is detected through a temperature probe and actuates relay R4 (step 202). When the HVAC thermostat is set to heat mode and the thermostat control turns on the HVAC system to heat, R3 is actuated. In response to the actuation of relays R3 and R4, (step 204) a pump P1 is activated to circulate heated water through a heat exchanger added to the HVAC system by a normally-open (N/O) zonal valve ZV3 and normally open (N/O) zonal valve ZV1, through the top of the heat exchanger and back through the normally-open (N/O) zonal valve ZV2 back to the hot water storage tank. (Step 210*a*) When the HVAC thermostat turns off the HVAC heat system, relay R3 de-energizes and pump P1 is shut off. (Step 210*b*) If the hot water storage tank temperature drops below 130 degrees Fahrenheit, or any preset threshold temperature, relay R4 de-energizes and disables pump P1 from actuating, but otherwise does not interfere or interrupt normal operation of the HVAC heating system.

Figure 8:
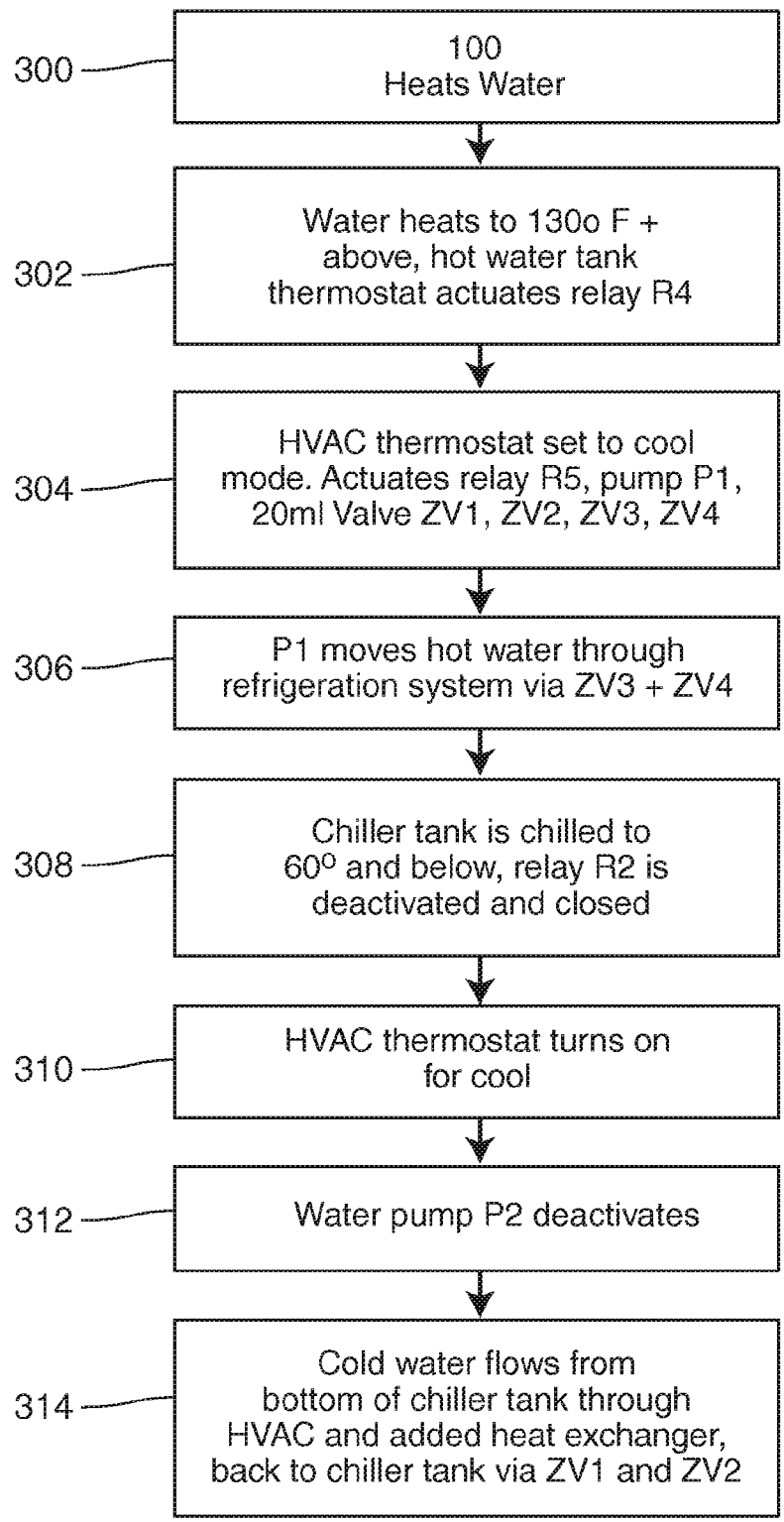
FIG. 8 is a schematic illustrating the steps of the solar collecting system operating in cooperation with an HVAC system set to the cool cycle.

As illustrated in FIGS. 6 and 8, step 300 has the system 100 heat the water stored in a hot water storage tank to at least 130 degrees Fahrenheit, a temperature threshold that is detected through a temperature probe and actuates relay R4 (step 302). When the HVAC thermostat is set to cool mode, R5 is actuated. In response to the actuation of R4 and R5, pump P1 is activated to circulate heated water through the absorption refrigeration system incorporated as part of a chiller tank added to the HVAC system (step 304). When the HVAC thermostat is set to cool mode the normally-closed (N/C) zonal valve ZV3 (step 306) and normally-closed (N/C) zonal valve ZV4 is opened and allows pump P1 to move heated water through the absorption refrigeration system, cooling the water in the chiller tank, and return to the storage tank (step 308). When the HVAC thermostat is set to cool mode, normally-closed (N/C) zonal valve ZV1, and normally-closed (N/C) ZV2 is opened to prepare the chiller water for flow through the HVAC system's added heat exchanger (step 310). The HVAC thermostat cool selector (or cool mode) actuates relay R5 and zonal valves ZV3 (in step 306) as well as ZV1 and ZV2 (in step 310).

When the HVAC thermostat control turns on the system to cool, relay R1 actuates and activates pump P2 (step 312) to supply chilled water from the bottom of the chiller tank through now opened, normally-closed (N/C) zonal valve 1 through the top of the added heat exchanger and returns to the top of the chiller tank through now opened, normally-closed (N/C) zonal valve ZV2 (step 314). The chiller tank thermostat monitors the chiller tank and deactivates normally-closed (N/C) relay R2 when the chiller tank water temperature drops to 60 degrees Fahrenheit or below (step 310).

Figure 9:
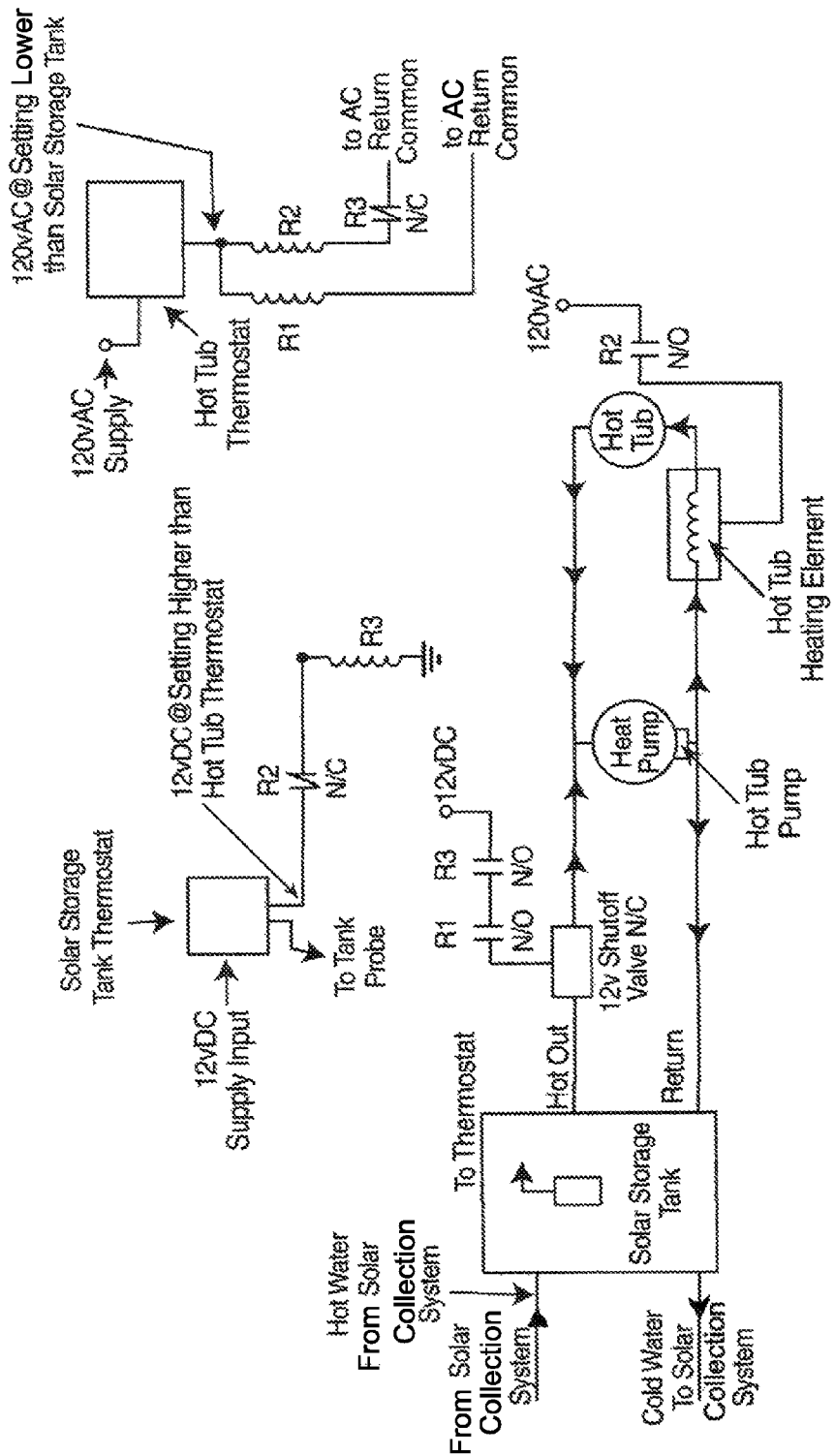
FIG. 9 is a schematic illustration of a solar collecting system incorporated with a hot-tub system.
Figure 10:
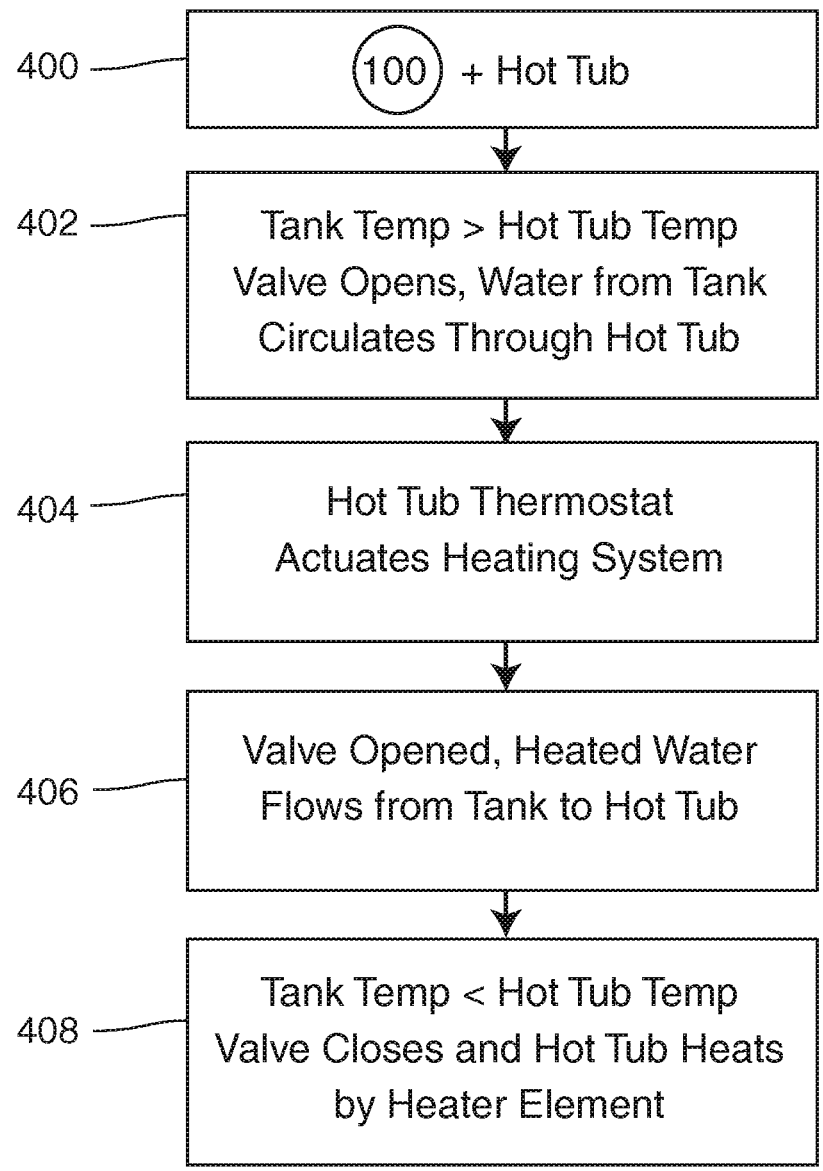
FIG. 10 is a schematic illustrating the steps of the solar collecting system operating in cooperation with a hot-tub system.

As illustrated in FIGS. 9 and 10, step 400 has the system 100 incorporated with a hot-tub system. A storage tank used to store solar heated water may be connected in parallel to a conventional hot-tub pump. An electrical shut-off valve is used to control the input from the solar water storage tank to prevent cooler-than-required water from entering the hot-tub. When the solar water storage tank water temperature is higher than the desired hot tub water temperature (usually set 5% above the normal desired hot tub temperature), the electrical valve is prepared by energized R3 through normally-closed (N/C) R2 to be opened by the hot tub thermostat to allow heated water from the tank to be circulated through the hot tub (step 402). Then when the hot tub thermostat turns on the electrical heating system (step 404), the valve is opened via energized R1 and heated water enters the hot tub from the storage tank (step 406), while the hot-tub heater element remains off due to now opened, normally-closed (N/C) R3 and de-energized normally-opened (N/O) R2. When the storage tank temperature drops below the desired preset temperature, the electrical shut-off valve closes by de-energized by normally-opened (N/O) R3 and the hot tub heats with the heater element (step 408).

Figure 11:
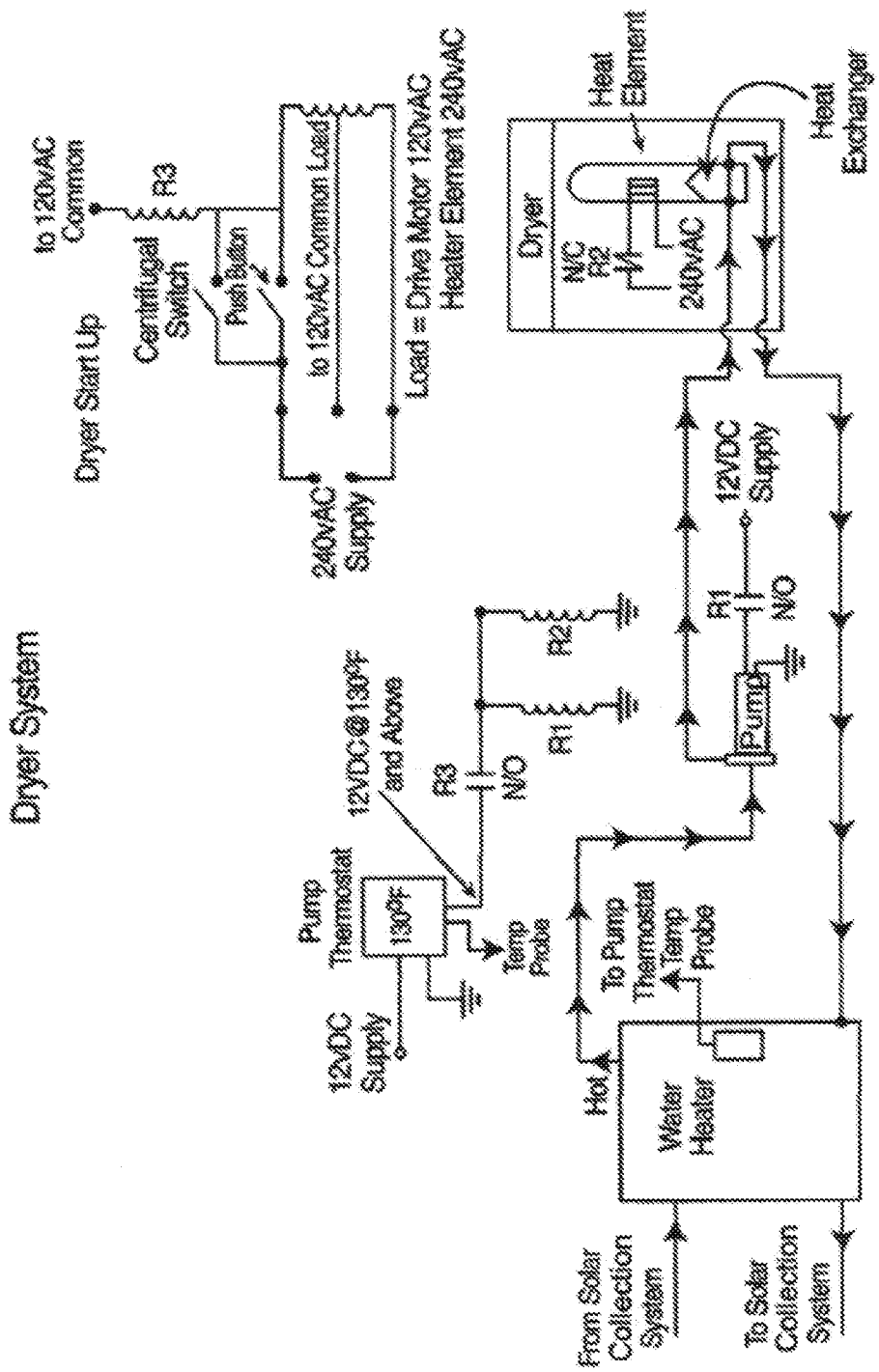
FIG. 11 is a schematic illustration of a solar collecting system incorporated with a dryer system.
Figure 12:
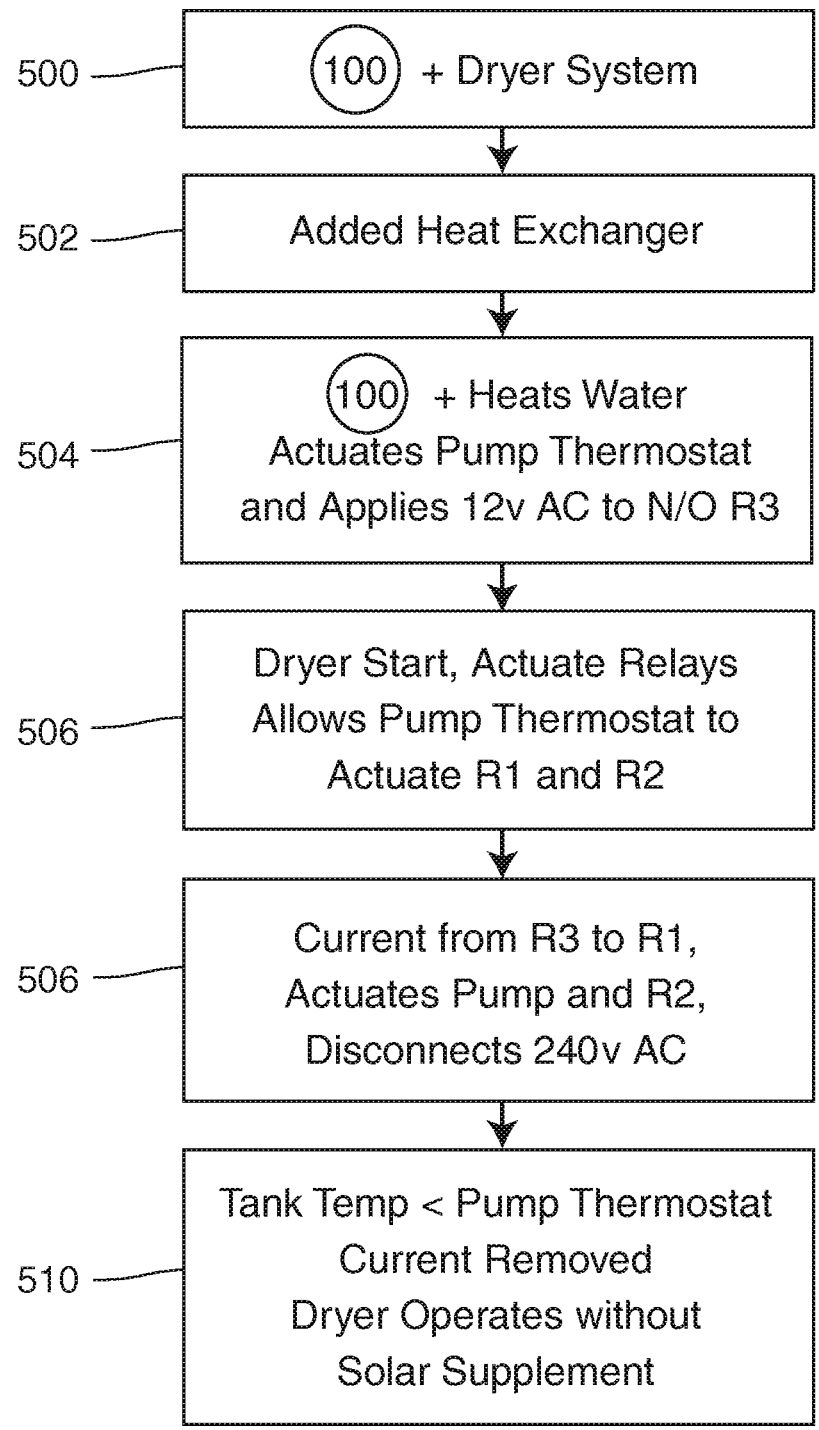
FIG. 12 is a schematic illustrating the steps of the solar collecting system operating in cooperation with a dryer system.

As illustrated in FIGS. 11 and 12, step 500 has the system 100 incorporated with a dryer system, including clothing dryers and dryers of various types. An additional heat exchanger may be installed within the heating element housing of the clothes dryer. Through this arrangement, hot water may be pumped through the heat exchanger (HE) to extract heat for drying clothes within the dryer drum (step 502). Residential water may be heated by the solar collection system 100 to temperatures of approximately 130 degrees Fahrenheit and above, which activates the pump thermostat to energize R1 and R2 when normally-opened (N/O) relay R3 is closed and removes voltage from the dryer's heater element through now opened, normally-closed (N/C) relay R2 (step 504). When the dryer is started, R3 is energized and normally-opened relay R3 is closed (step 506). Closed relay R3 provides current from the pump thermostat (12 v DC) to energize relay R1, which actuates the pump through now closed relay R1, and energizes relay R2 that removes 240 AC from the dryer heater element (step 508). If the water tank temperature drops below the pump thermostat setting, current (12 v DC) is removed by the pump thermostat allowing the dryer to work with the dryer heater element only (step 510).

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. A solar collection system comprising:
   a solar collector apparatus;
   a collector support frame assembly;
   a sun position tracking apparatus;
   a fluid transfer pump;
   a fluid storage tank;
   an insulated pipe for connecting the fluid transfer pump to the fluid storage tank and the solar collector apparatus; and
   a differential temperature controller, wherein,
   the solar collector apparatus comprising:
      a photovoltaic panel for battery back-up regulated power supply;
      a glaze pivotally mounted about an axis;
      a differential controller probe;
      a radiant-to-heat energy converter absorber having concentric tri-layered tubing;
      a mounting backboard;
      a bottom panel;
      a plurality of insulating layers disposed between the radiant-to-heat energy converter absorber and the bottom panel; and
      an outer molding, the outer molding having a plurality of spacers disposed between an outer circle of the concentric tri-layered tubing, the mounting backboard, the plurality of insulating layers, and the bottom panel to control heat loss via conduction, convection, and radiation;
   the sun position tracking apparatus comprises:
      a sensor module;
      a dual axis controller module, the dual axis control module automatically adjusts the solar collector apparatus bi-directionally as the azimuth of the sun changes throughout the day;
      a safety override relay controller probe; and
      a safety override relay controller, wherein the safety override relay controller probe is mounted on a top surface of the concentric tri-layered tubing proximate a center of the solar collector apparatus, the safety override relay controller probe measures temperature and the safety override relay controller energizes the safety override relay to disconnect the sensor module from the dual axis controller module.

2. The system of claim 1, wherein the collector support frame assembly comprises:
   at least one mounting arm; and
   at least one central arm upstanding from a base.

3. The system of claim 2, further comprising at least one angled arm supporting the at least one central arm.

4. The system of claim 2, wherein the collector support frame assembly further comprises a horizontal actuator and a vertical actuator.

5. The system of claim 4, wherein the horizontal actuator and the vertical actuator are operatively coupled with the sun position tracking apparatus for bi-directional movement of the solar collector apparatus in response to the changing position of the sun.

6. The system of claim 1, wherein the sensor module creates a center offset with the dual axis controller module to generate a signal to actuate the change in position of the solar collector apparatus.

7. The system of claim 6, wherein the dual axis controller module communicates with a plurality of actuators for controlling the horizontal and vertical movement of the solar collector apparatus in response to the change in the sun's position.

8. A method for circulating water through a heating and cooling system, the method comprising the steps of:
   installing a solar collecting system having a solar collector apparatus, a collector support frame assembly, and a sun-position tracking apparatus, wherein the solar collector apparatus comprising a radiant-to-heat energy converter absorber having concentric tri-layered tubing, and wherein the sun-position tracking apparatus comprising a sensor module, a safety override relay controller probe; and a safety override relay controller, wherein the safety override relay controller probe is mounted on a top surface of the concentric tri-layered tubing proximate a center of the solar collector apparatus, the safety override relay controller probe measures temperature and the safety override relay controller energizes the safety override relay to disconnect the sensor module from the dual axis controller module;
   coupling operatively the solar collecting system with a heating or cooling system;
   collecting sunlight via the solar collecting system;
   transferring the collected sunlight energy to heat or cool water;
   circulating the heated or cooled water through the heating or cooling system; and
   exchanging the heated or cooled water through a heat exchanger added to the heating or cooling system and to heat or cool water for storage in a water storage tank.

* * * * *